United States Patent
Smith et al.

(10) Patent No.: US 7,121,806 B2
(45) Date of Patent: Oct. 17, 2006

(54) WELDING METHOD AND AN ASSEMBLY FORMED THEREBY

(75) Inventors: Tyn Suttle Smith, Allegany, NY (US); Donald Warren Johnson, Eldred, PA (US)

(73) Assignee: Dresser-Rand Company, Olean, NY (US)

( * ) Notice: Subject to any disclaimer, the term of this patent is extended or adjusted under 35 U.S.C. 154(b) by 189 days.

(21) Appl. No.: 10/741,945

(22) Filed: Dec. 19, 2003

(65) Prior Publication Data

US 2005/0133569 A1    Jun. 23, 2005

(51) Int. Cl.
*F01D 5/30*   (2006.01)
*B23K 31/00*  (2006.01)

(52) U.S. Cl. .................. 416/213 R; 228/125; 228/155

(58) Field of Classification Search ............. 29/889.21, 29/889.22; 416/213 R, 204 A; 228/125, 228/155, 159
See application file for complete search history.

(56) References Cited

U.S. PATENT DOCUMENTS

| | | | |
|---|---|---|---|
| 1,733,594 A | 10/1929 | Greer et al. | |
| 2,226,496 A | 12/1940 | Jacocks | |
| 2,710,443 A | 6/1955 | Webb | |
| 2,753,622 A | 7/1956 | Bieber et al. | |
| 3,570,356 A | 3/1971 | Williams et al. | |
| 3,631,585 A | 1/1972 | Stamm | |
| 4,333,001 A * | 6/1982 | Nakahama et al. | ..... 219/137 R |
| 4,476,370 A | 10/1984 | Kakihara | |
| 4,532,446 A | 7/1985 | Yamamoto et al. | |
| 4,564,743 A * | 1/1986 | Birley et al. | ............ 219/137 R |
| 4,799,616 A | 1/1989 | Simpson et al. | |
| 5,342,171 A | 8/1994 | Stanko | |
| 6,225,206 B1 | 5/2001 | Jimarez et al. | |
| 6,279,812 B1 | 8/2001 | Hallqvist | |

* cited by examiner

*Primary Examiner*—Edward K. Look
*Assistant Examiner*—Richard A. Edgar
(74) *Attorney, Agent, or Firm*—Michael Best & Friedrich LLP

(57) ABSTRACT

A method of welding and an assembly formed thereby, according to which a first member is formed with a first thickness and a second thickness greater than the first thickness. The first member is welded to a second member and a toe is formed in at least one wall of the first member in that portion of the first member having the increased thickness.

28 Claims, 1 Drawing Sheet

WELDING METHOD AND AN ASSEMBLY FORMED THEREBY

BACKGROUND

The present invention relates to a method of welding and an assembly formed by the method.

Welding methods are often very critical when an assembly if formed by welding two or more components together. For example, an important consideration in connection with rotary machines including compressors, turbines, refrigeration and gas liquefaction units, and the like, is the design of the impellers since they substantially affect the performance of the machine. A typical radial flow impeller includes a plurality of angularly-spaced blades extending from a central support member, such as a hub or a shroud. However, the blades are often welded to the support member in a manner that results in significant steady state and alternating stresses within the weld joint, and a reduction in fatigue resistance.

Therefore, what is needed is welding technique that eliminates, or at least significantly reduces, the above problems.

DETAILED DESCRIPTION

Figure 1:
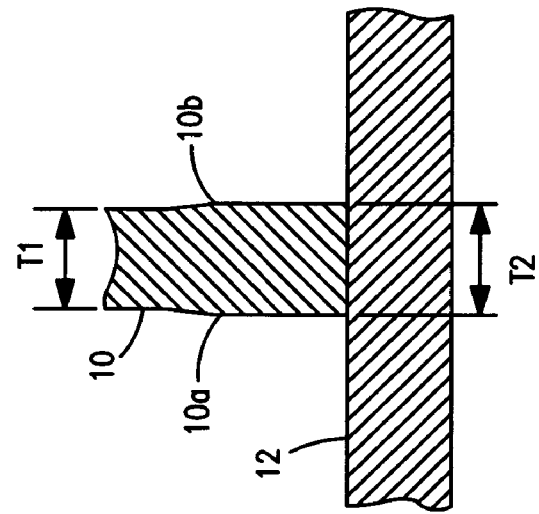
FIGS. 1–3 are sectional views of an impeller depicting three manufacturing steps according to an embodiment of the invention.

Referring to FIG. 1, the welding technique according to an embodiment of the present invention will be described, for the purpose of example, in connection with welding an impeller blade 10 that extends perpendicular to, and radially from, a support member 12, which, for the purpose of example, is in the form of a hub or shroud. The blade 10 and the member 12 form a portion of an impeller assembly used in a rotary machines (not shown) such as a compressor, turbine, refrigeration and gas liquefaction unit, and the like. Although not shown in the drawing, it is understood that additional blades, which can include splitter blades and blades similar or identical to the blade 10, also extend from the member 12 in an angularly-spaced relation to the blade 10. The blade 10 is connected to the outer surface of the member along one edge of the blade in a manner to be described.

The thickness, or width, of a major portion of the blade 10, as viewed in FIG. 1, is represented by T1. However, the thickness of the blade 10 increases from the thickness T1 to an increased thickness represented by T2 at an area of the blade spaced from, and in a direction towards, the member 12. As a result, the opposite side walls of the blade 10 have two gradually tapered, or flared, portions 10a and 10b, respectively, extending from the portion of the blade having the thickness T1 to the portion of the blade having the thickness T2. The thickness T2 extends from the lower portions of the tapered portions 10a and 10b to the edge of the blade connected to the member 12.

Figure 2:
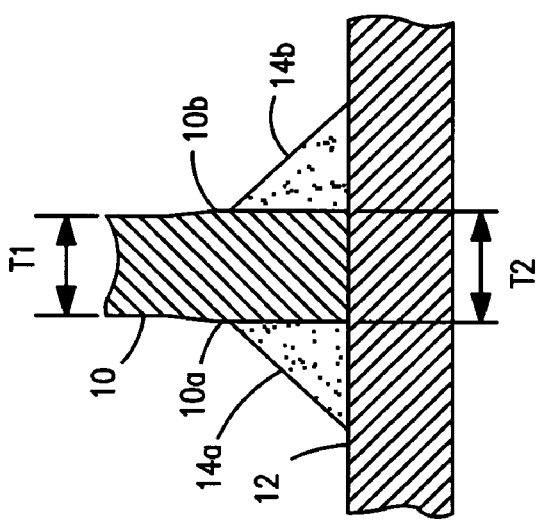

FIG. 1 depicts a first manufacturing step in the preparation of the blade 10 in accordance with an embodiment of the invention, which includes forming of the blade with the thicknesses T1 and T2 and the tapered portions 10a and 10b, and FIG. 2 depicts a second step. In particular, two welds 14a and 14b are made at the corners between the two side walls of the blade and the corresponding surfaces of the member 12. The welds 14a and 14b extend along the respective walls of the blade 10 from just below the lower portions of the tapered portions 10a and 10b, as viewed in the drawing, to the member 12 and along the corresponding walls of the latter member. The welds 14a and 14b can be in the form of any conventional welds such as a full or partial penetrating fillet welds, or the like.

Figure 3:
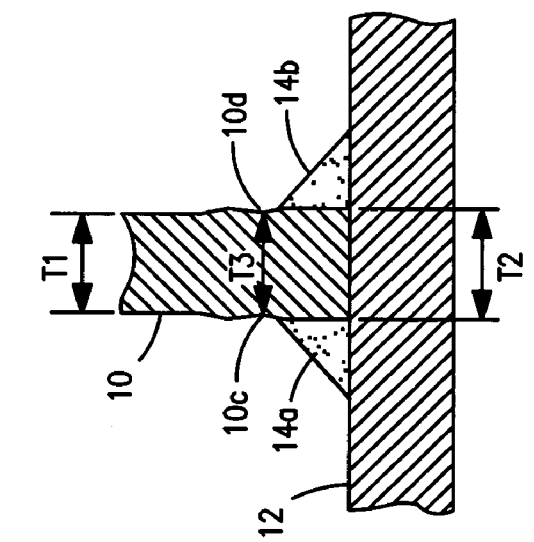

The final welded assembly is shown in FIG. 3 after an additional manufacturing step. In particular, two concave toes 10c and 10d are formed into the opposite side walls of the blade 10 and into the welds 14a and 14b. The toes 10c and 10d can be formed in any conventional manner such as by cutting, grinding or by a resolidification welding step. The toes 10c and 10d extend from the area of the blade 10 having the thickness T2 just above the welds 14a and 14b, respectively, (often referred to as the "heat affected zone") into the upper portions of the welds. As an example, approximately one half of each toe 10c and 10d extends in the latter area of the blade and the remaining half of each toe extends into the weld. The thickness of the blade 10 as a result of the forming of the toes 10c and 10d is represented by T3. Thus, a generous radius at the weld toes 10c and 10d is permitted without compromising the thickness T3.

As an example of the above dimensions, it will be assumed that the thickness T1 is approximately 0.46 inch, and the thickness T2 is approximately 0.52 inch. Thus each wall of the blade would be 0.06 inch greater in the area having the thickness T2 when compared to the walls in the area having the thickness T1. Each toe 10c and 10d is formed in that portion of the blade having the increased thickness T2, and each toe is formed to a depth of approximately 0.03. Therefore, the thickness T3 of the blade 10 at the toes 10c and 10d, is equal to the thickness T2 (0.52 inch) reduced by 0.06 inch to a value of 0.46 which is approximately equal to the thickness T1. Thus, the toes 10c and 10d are formed without undercutting, or reducing, the thickness T1.

According to another example, it will be assumed that the thickness T1 is approximately 0.46 inch, and the thickness T2 is approximately 0.52 inch, as in the previous example. In this case, each toe 10c and 10d would extend to a maximum depth of 0.025 inch, to form a thickness T3. Since portions of the toes 10c and 10d are formed in that portion of the blade having the increased thickness T2, the thickness T3 is equal to the thickness T2 (0.52 inch) reduced by 0.05 inch to a value of 0.47 which is slightly greater that the thickness T1. Thus, the toes 10c and 10d are formed without undercutting, or reducing, the thickness T1.

It is emphasized that the dimensions of the thicknesses T1, T2, and T3, as well as the depth of the toes 10c and 10d, as set forth above, are only for the purpose of example and that they can vary within the scope of the invention.

It can be appreciated that the blade 10 can be positioned relative to the member 12 with the lower edge of the blade engaging a corresponding surface of the member as viewed in the drawings at any stage of the above sequence of steps, and that the blade is shown so positioned relative to the member in all three figures for the convenience of presentation. Also, it is understood that the depth, or length, of the toes 10c and 10d and the welds 14a and 14b can extend for the entire length of the blade 10.

It is understood that toes can also be made in the surfaces of the member 12 adjacent the welds 14a and 14b, and that the thickness of the member 12 can be increased accordingly to accommodate the latter toes without undercutting the member 12 in the same manner as discussed above in connection with the member 10.

As a result of the above, the weld joints have extra material for stress reduction, yet the relative low thickness T1 can be maintained in a significant area of the blade 10 spaced from the welds 14a and 14b, which thickness is ideal from a design standpoint to allow flexure away from the welds that reduces bending stress and overall aerodynamic blockage, and permits operation at a higher centrifugal speed. Levels of stresses on the weld joing, such as bending stress, tensile stress, local stress concentration, as well as alternating and mean stress levels, are thus reduced along with susceptibility to quench, heat treatment, and overspeed (proof testing) cracking. Also, increased fatigue resistance and the lives of the weld joints and subsequently the overall assembly is achieved. Still further, grinding tolerances and flexibility are increased without degrading weld joint performance, and relative large shot size can be used when shot preening for more fatigue resistance. The relative small thickness T1 is maintained in a significant area of the blade 10 spaced from the welds 14a and 14b, which thickness is ideal from a design standpoint to allow flexure away from the joint that reduces overall joint stress and reduces overall aerodynamic blockage.

The above technique allows improved sensitivity and flaw identification using non-destructive inspection techniques such as wet or dry magnetic particle or dye penetrant techniques. Overall, this technique also allows the analysis effort for fatigue and other failure mechanisms to move away from a fracture mechanics approach towards a continuum approach for a welded structure.

VARIATIONS

It is understood that variations may be made in the above without departing from the scope of the invention. Examples of the variations are as follows:

1. The above embodiment is not limited to the welding of a blade to a support member, but is equally applicable to the welding of other types of components to form a welded assembly.

2. The above embodiment is not limited to joining two members at a 90-degree angle but rather the angle between the members can vary from a relatively large acute angle to a relatively large obtuse angle.

3. The sequence of at least some the manufacturing steps shown in FIGS. 1–3 can be changed.

4. The above-mentioned specific dimensions of the members discussed above, including the dimensions of the thicknesses T1, T2, and T3 as well as the radii of the toes 10c and 10d can be varied within the scope of the invention.

5. Spatial references, such as "side", "edge", "radial", "angular" "perpendicular" "below", etc., are for the purpose of illustration only and do not limit the specific spatial orientation of the structure described above.

6. A weld toe, of the above type, can be formed in only one side wall of the blade.

7. The shape of the blade 10 at both thicknesses T1 and T2 can vary and, for example, could take an "hourglass" shape in which the width of the blade is variable along its length in a directions towards the member.

8. The shape of the welds 14a and 14b can be different than illustrated in the drawings, and, as such, could have different convexity or shaped hypotenuse.

9. Toes, similar to the toes 10c and 10d could be formed in the support member 12 and welds 14a and 14b in the same manner as described above in connection with the blade 10, in which case the corresponding dimensions of the support member 12 would be modified, such as widened, to accommodate the toes.

10. The welds and the toes discussed above can be made in only one wall of the blade 10 rather than in the opposed walls as shown.

11. The relative portions of each weld and the blade that are reduced during the formation of the weld toes 10c and 10d can vary.

12. The above welds and toes have been shown, for the purpose of example in connection with the side walls or edges of the blade 12, and it is understood that they could also be applied to the leading (front) and trailing (rear) walls or edges.

Although only one exemplary embodiment has have been described in detail above, those skilled in the art will readily appreciate that many other variations and modifications are possible in the exemplary embodiment without materially departing from the novel teachings and advantages of this invention. Accordingly, all such variations and modifications are intended to be included within the scope of this invention as defined in the following claims. In the claims, means-plus-function clauses are intended to cover the structures described herein as performing the recited function and not only structural equivalents, but also equivalent structures.

What is claimed is:

1. A method of manufacturing an impeller assembly, comprising the steps of:
   providing a first member having a first portion of a first thickness and a second portion of a second thickness, the two first member portions being integrally formed and the second thickness being greater than the first thickness, and a second member, one of the first and second members being an impeller blade,
   welding the first member to a the second member to form at least one weld that extends along a wall portion of the second portion of the first member, and
   forming a toe extending into the first member second portion, the toe having a depth such that the first member thickness at the toe is at least the thickness of the first portion.

2. The method of claim 1 wherein the toe extends from the second portion of the first member adjacent the weld into a portion of the weld.

3. The method of claim 1 wherein the depth of the toe is such that the thickness of the second portion of the first member is no less than the predetermined thickness.

4. The method of claim 3 wherein the depth of the toe is such that the thickness of the second portion of the first member at the toe is approximately equal to the thickness of the first portion of the first member.

5. The method of claim 3 wherein the depth of the toe is such that the thickness of the second portion of the first member at the toe is greater than the thickness of the first portion of the first member.

6. The method of claim 1 wherein the first member has a tapered, or flared portion extending between the first and second portions.

7. The method of claim 6 wherein the first member is connected to the second member along an edge of the first member.

8. The method of claim 7 wherein the toes extend adjacent the tapered portions and between the tapered portion and the edge of the first member.

9. The method of claim 7 wherein the second portion of the first member extends from the edge of the first member to an area of the first member between the edge and the opposite edge of the first member.

10. The method of claim 1 wherein a toe is formed in each of the two opposed side walls of the second portion of the first member.

11. The method of claim 10 wherein there are two welds that extend along opposite walls of the second portion of the first member, and wherein there are two toes formed in the opposite walls adjacent the respective welds.

12. The method of claim 1 wherein the weld extends from the toe to the second member.

13. The method of claim 12 wherein the weld also extends along a corresponding wall of the second member.

14. The method of claim 1 wherein the first member is an impeller blade and the second member is a hub or shroud.

15. A welded impeller assembly comprising:
a first member having a first portion of a first thickness and a second portion of a second thickness, the two first member portions being integrally formed and the second thickness being greater than the first thickness,
a second member, one of the first and second members being an impeller blade,
a weld extending along a wall portion of the second portion of the first member and to the second member to weld the members together, and
a toe formed in the first member second portion, the toe having a depth such that the first member thickness at the toe is at least the thickness of the first portion.

16. The assembly of claim 15 wherein the toe extends from the second portion of the first member adjacent the weld into a portion of the weld.

17. The assembly of claim 15 wherein the depth of the toe is such that the thickness of the second portion of the first member at the toe is no less than the predetermined thickness.

18. The assembly of claim 17 wherein the depth of the toe is such that the thickness of the second portion of the first member at the toe is approximately equal to the thickness of the first portion of the first member.

19. The assembly of claim 17 wherein the depth of the toe is such that the thickness of the second portion of the first member at the toe is greater than the thickness of the first portion of the first member.

20. The assembly of claim 15 wherein the first member has a tapered or flared portion extending between the first and second portions.

21. The assembly of claim 20 wherein the first member is connected to the second member along an edge of the first member.

22. The assembly of claim 21 wherein the toes extend adjacent the tapered portions and between the tapered portions and the edge of the first member.

23. The assembly of claim 21 wherein the second portion of the first member extends from the edge to an area of the first member between the edge and the opposite edge of the first member.

24. The assembly of claim 15 wherein a toe is formed in two opposed side walls of the second portion of the first member.

25. The assembly of claim 15 wherein there are two welds that extend along opposite walls of the second portion of the first member, and wherein there are two toes formed in the opposite walls adjacent the respective welds.

26. The assembly of claim 15 wherein the weld extends from the toe to the second member.

27. The assembly of claim 26 wherein the weld also extends along a corresponding wall of the second member.

28. The assembly of claim 15 wherein the first member is an impeller blade and the second member is a hub or shroud.

* * * * *